Patented Dec. 18, 1951

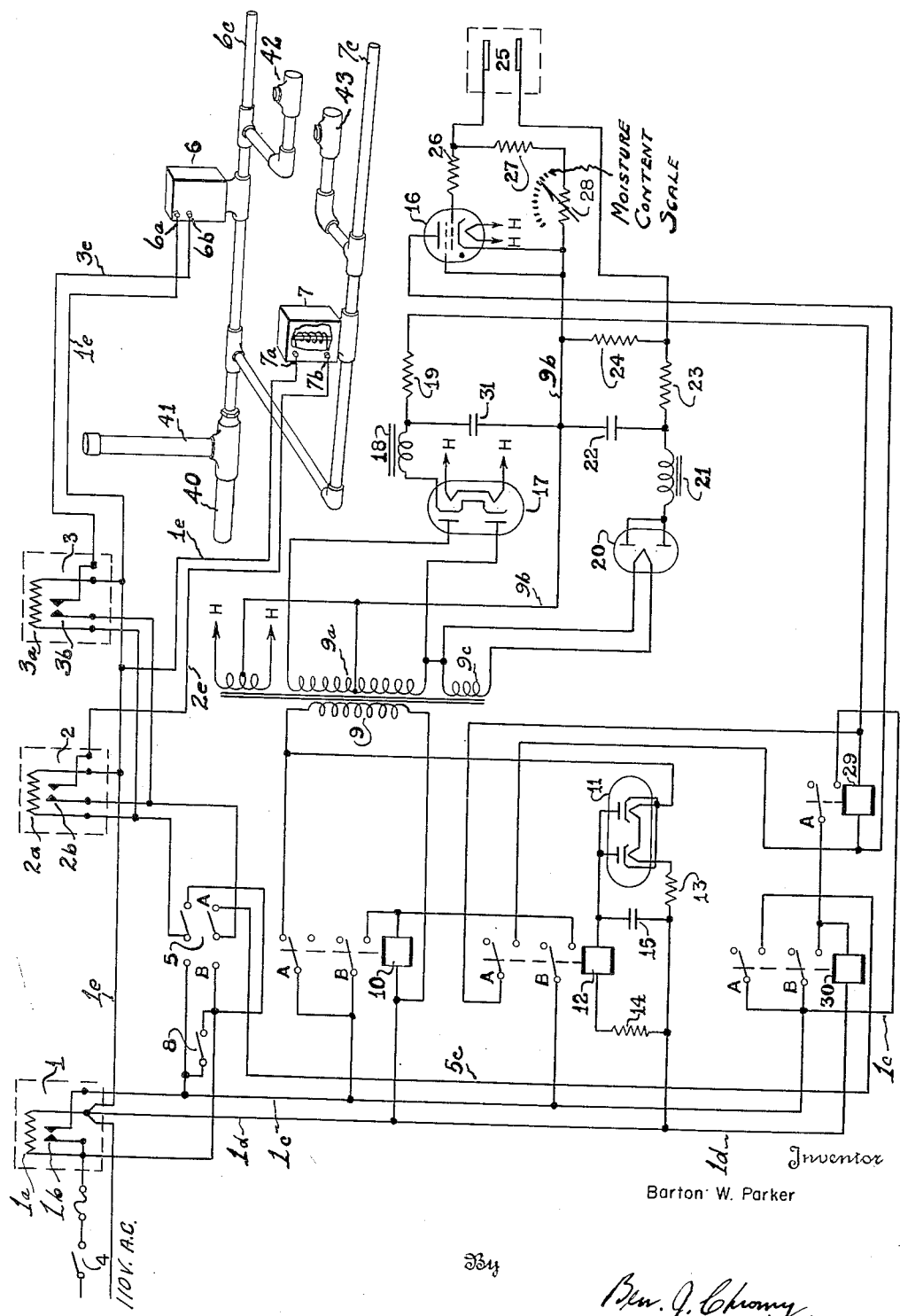

2,578,981

UNITED STATES PATENT OFFICE 2,578,981

ELECTRONICALLY OPERATED SOIL SPRINKLING OR IRRIGATING SYSTEM

Barton W. Parker, Berkeley, Calif.

Application June 26, 1947, Serial No. 757,166

14 Claims. (Cl. 299—27)

This invention relates to electronically operated soil sprinkling or irrigating systems. More particularly this invention relates to an electronic apparatus responsive to the moisture content of soil for controlling watering of the soil when the moisture content is lower than desired.

An object of this invention is to provide an electronic apparatus for measuring the moisture content of soil and controlling the watering of the soil when the moisture content is lower than that desired.

Another object of this invention is to provide a Thyratron device connected to be responsive to the moisture content of soil and arranged to control the energization of solenoid valves to water the soil when the moisture content is below that desired.

A further object of this invention is to provide an electronic apparatus for determining the moisture content of soil, said electronic apparatus being interlocked with the time control apparatus to provide watering of the soil at certain predetermined hours if the moisture content of the soil is below that desired.

Other and further objects of this invention will be apparent to those skilled in the art to which it relates from the following specification, claims and drawing.

My electronically-operated soil sampling system controls completely and automatically any system for the sprinkling of lawns, orchards, or any plot of ground requiring irrigation by artificial means. The invention is essentially a device which controls the sprinkling apparatus by measuring the conductivity or moisture content of the soil and thus determines whether or not the land needs water. Hence, the water supply is utilized much more efficiently, eliminating wasteful and unnecessary watering through scientific control. Since the operation of the installed unit is completely automatic, care and attention of any aspect of the watering process is unnecessary.

The unit can be so regulated as to permit sprinkling at any time. Night and early-morning sprinkling is advantageous in many respects. Primarily, pressure is higher at night because of the fact that there is less drain on the water supply. Consequently, a finer spray is emitted from the sprinklers, facilitating introduction of nitrogen to the soil and benefiting plant life. In addition, humidity is higher at night, decreasing loss of water discharged into the air and aiding absorption of moisture by the ground.

The unit is light, compact, simple in design, and operates from regular city power services. The installation on new springling systems is easily accomplished, and it is also readily adapted to use with existing systems.

The remainder of the equipment consists of the usual water conduits and sprinkler heads, one master timing switch, an additional set of electric timing switches or clocks, and a system of solenoid valves. These valves can be either magnetic or motor-driven and are energized by the contacts of the timing clocks.

The water pressure in city systems is generally not strong enough to provide a complete sprinkling of one plot of land instantaneously. For this reason, the sprinkling system is divided into sections, each consisting of several sprinkler heads and each of which is controlled by a separate valve and timing switch. These switches are so regulated that only one section operates at a time, thus making full use of the water pressure. The timing switches for all the sections are set so that they operate in immediate succession. The first timing switch will operate for a specific length of time; then it opens the circuit and closes the valve feeding its section. Then the second timing switch goes into effect and its section is watered. When it opens the circuit again, the third timing switch operates, and so on.

A typical operation of the water-sprinkling system may be described as follows:

The master timing switch permits the test for soil conductivity preferably between the hours of two and four in the morning. If the moisture content is low, then the unit operates to supply power to the secondary timing switches. The first one of these opens the solenoid valve in its section, permitting that section to be watered for fifteen minutes. At the end of that time the first valve is closed and the one controlling the second section is opened, watering that section for fifteen minutes. This process repeats itself for every section until the entire plot of ground has been thoroughly sprinkled with a maximum of efficiency.

Briefly, this electronic control when once put into operation requires no attention. It automatically samples the soil for moisture content at a predetermined time every day. If the soil is dry and needs water, the control will let the solenoids be energized and the lawn sprinkled. If the ground is wet and needs no water the solenoids will not be energized and watering will not take place. At the same time the following day the control repeats the same operation. With this installation a person could leave home for any length of time feeling assured that his lawn, flowers, and shrubs would be watered when necessary.

Other features of this invention will be apparent from the following specification, claims and drawing in which the sole figure is a schematic wiring diagram of an embodiment of this invention.

Referring to the drawing in detail reference numerals 1, 2 and 3 designate single circuit twenty-four hour time clocks of conventional design and now available on the open market. Clock 1 is provided with a winding 1a and contacts 1b, the winding 1a being connected through a switch 4 to a conventional 110 volt A. C. supply. One of the contacts 1b is connected to one side of the 110 volt A. C. supply and the other of these contacts is connected to the line 1c leading to the switch 8, to one of the B contacts of switch 5, to both A and B switch blades of relays 10 and 30, to the B switch blades of relay 12, and to one of the contacts of relay 29. One end of the winding 1a of the clock 1 is connected to a corresponding end of the windings 2a and 3a of the clocks 2 and 3, respectively, and to terminals 6a and 7a of the solenoids 6 and 7, respectively, by the line 1e. This line 1e is connected to line 1d at the clock 1 and through this line 1d to the solenoid of relay 10, to the lower terminal of the primary of transformer 9, to the lower terminal of the resistor 14 and to one end of the solenoid of relay 30. A manual switch 8 is connected across the contacts 1b of the clock 1 and is also connected across the contacts B of the double pole double throw switch 5. The upper blade of the switch 5 is connected to the left hand end of each of the windings 2a and 3a of the clocks 2 and 3, respectively, and the lower blade of this switch is connected to the left hand contacts of each of the switches 2b and 3b of the clocks 2 and 3, respectively. The right hand contact of the switch 2b is connected through line 2e to the terminal 7b of the solenoid 7 and the right hand contact of the switch 3b is connected through line 3e to the terminal 6b of the solenoid 6. The upper A contact of the switch 5 is connected to the lower B contact of the switch and the lower A contact of switch 5 is connected through line 5c to the lower A contact of the relay 30. The upper A contact of the relay 10 is connected to the upper terminal of the primary of the transformer 9 and to the cathode and cathode heater of the rectifier 11. The other end of the cathode heater of the rectifier 11 is connected through the resistor 13 to one side of the capacitor 15, to one side of the resistor 14 and to the line 1d. The lower B contact of the relay 10 is connected to the right hand terminal of the solenoid of this relay and to the lower B contact of the relay 12. The solenoid of the relay 12 is connected with one terminal to the upper terminal of the resistor 14 and with the other terminal to the top of the capacitor 15 and to the anodes of the rectifier 11. The switch blade A of the relay 12 is connected to the right hand terminal of the solenoid of relay 29 and to the right hand end of the resistor 19. The lower A contact of the relay 12 is connected to the left hand terminal of the solenoid of relay 29 and to the anode of the Thyratron 16. The A blade of the relay 29 is connected to the lower B contact of relay 30 and to the right hand terminal of the solenoid of the relay 30.

The transformer 9 is provided with an upper secondary having terminals H connected to the terminals H of the cathode heater of the Thyratron 16. The center tap of this secondary is connected to the center tap of the high voltage secondary 9a and through line 9b to the lower terminal of the capacitor 31, the upper terminals of the capacitor 22 and resistor 24, to the suppressor grid and cathode of the Thyratron 16 and to the left hand terminal of the variable resistor 28. The upper end terminal of the secondary 9a is connected to the upper anode of the rectifier 17 and the lower terminal is connected to the lower anode of the rectifier 17 and to the upper terminal of the secondary 9c which is connected to the filament of the rectifier 20. The anodes of the rectifier 20 are connected to the left hand terminal of the choke 21 and the right hand terminal of this choke is connected to the lower terminal of the capacitor 22 and to the left hand terminal of the resistor 23. The right hand terminal of the resistor 23 is connected to the lower terminal of the resistor 24 and to the lower electrode of the soil electrodes 25. The cathode heaters of the rectifier 17 are connected to the H secondary of the transformer 9 and the cathode is connected to the choke 18. The right hand terminal of this choke 18 is connected to the upper terminal of the capacitor 31 and the left hand terminal of the resistor 19, the right hand terminal of this resistor being connected to the relay 29 as previously described. The control grid of the Thyratron 16 is connected to the left hand terminal of the resistor 26, the right hand terminal of this resistor being connected to the upper terminal of the resistor 27 and the upper electrode of the soil electrodes 25.

The solenoids 6 and 7 are arranged to open valves in pipes 6c and 7c, respectively, when the solenoids are energized, thus permitting water to flow out of the sprinklers attached to the right hand ends of these pipes 6c and 7c from the main supply pipe 40. A capped pipe 41 is installed in vertical position in front of the solenoids 6 and 7 and check valves 42 and 43 are installed after the solenoids 6 and 7, respectively, for the purpose of lessening or preventing water hammer action when the solenoids 6 and 7 are deenergized and the valves associated therewith are closed.

The two electrodes 25 are buried in the soil at some convenient place which will be within the sprinkling radius of one of the sprinkler heads. It must be near the surface, preferably about one inch from the surface of the soil. These prods or electrodes can be of many different metals, sizes, spacings, and from experiments, it has been found that the metal, copper, is best suited. When any two metals are placed in moist earth there is a voltage developed between these two pieces of metal due to electrolytic action. However, with copper this voltage is too small to effect the sampling of the soil.

These two prods should be made of copper tubing about 12 inches long and separated about 3 or 4 inches apart with some insulating material that will not deteriorate when placed under the soil. The resistance of soil varies with the amount of water it contains, the D. C. resistance of wet soil being much less than dry soil. With two copper rods 12 inches long, separated by a distance of 3 inches and placed horizontally 1 inch under the surface of the soil, the D. C. resistance will be between 200 and 500 ohms when soil is thoroughly soaked during hard rain. When the moisture content of the soil is less due to the water evaporating or draining into the ground it has been found that when the resistance of the soil goes up to about 1800 ohms the soil gets to the point where it should be watered. These values vary with different soils and localities and the above values are typical of this locality only.

The prods 25 should not be placed any more than an inch under ground when using this control system for the irrigation or watering of lawns, for the reason that soil does not dry out as fast deeper down as it does near the surface. Also the roots of the grass are near the surface. During a hot day, the moisture near the surface dries out very fast while deeper down the ground remains moist and would probably be wet enough if the roots of the grass went down far enough to pick up the moisture.

In the network of resistors in the grid circuit of the trigger or gas tube, the resistance 26 is connected between the grid and one of the prods 25 and this resistance is of high value. The resistance 27 and variable resistance 28 are determined by the value of the resistance of the soil that is used for conductivity test.

With this one control or variable resistor 28, the operator can choose at what moisture content the soil should be sprinkled. If he decides that more water is needed, he can decrease the resistance of the variable resistance 28 and the bias on tube 16 will be lowered thereby pulling in relay 29 causing the solenoids 6 and 7 to be energized. Likewise, if he decides that the lawn is too wet, he can increase the resistance 28 and the bias on tube 16 will be raised. Thereupon tube 16 will not fire until the resistance of the soil has increased. This can only take place by the moisture evaporating from the soil. The dial on this variable resistor 28 is graduated so the operator can adjust this control for any desired moisture content of the soil.

The operation of this invention is as follows:

The contacts of master clock 1 make contact at the preselected time of day that the lawn is to be watered or soil sampled and continue to make contact for the duration of time that the sprinkling is to take place. With the double pole double throw switch 5 in the A position, the secondary clocks 2 and 3 controlling solenoids 6 and 7 respectively, are energized.

For example, if one decides to water at four o'clock in the morning for a period of half an hour, the switch of the master clock will continue to make contact until four-thirty. The switch of secondary clock 2 will make contact at 4:00 a. m. and break contact at 4:15. At 4:15, the switch of the secondary clock 3 will make contact, and break contact at 4:30. At 4:30 master clock 1 will break contact thereby turning off the system.

The contacts of clock 1 have two functions: The first, to supply voltage to the electronic control or sampling system; the second, to supply voltage to the contacts of secondary clocks 2 and 3. The respective contacts of clocks 2 and 3 will energize the valve solenoids 6 and 7 if the electronic system has indicated that the soil needs watering. When the contacts of clock 1 make contact, voltage is supplied to the primary of the transformer 9 through the normally-closed A contacts of relay 10. When the primary of transformer 9 is energized, the secondary of this transformer supplies the high and low voltage necessary for this particular part of the electronic sampling system and will be described later.

Also, when the contacts of clock 1 make contact, voltage is supplied through the normally closed A contacts of relay 10 to the filament and across a diode rectifier 11. This rectifier acts as a time delay to remove the voltage from transformer 9 and also to remove the voltage from the time delay after the sampling of the soil has taken place. A resistor 13, of the value of the filament resistance of the tube 11 is connected in the filament circuit of this tube to slow the heating of the filament of the rectifier 11. As the indirectly-heated cathode of the diode 11 is heated slowly, it will be a short interval (around a minute) before the diode passes enough current to energize relay 12 through the load resistor 14. Chattering of the relay 12 is prevented by the condenser 15 which functions to smooth this rectified current.

The relay 12 closes after a short time interval due to the slow warming up of the diode rectifier 11, and the normally open contacts B are closed, thereby energizing the coil of relay 10 which closes contacts B and opens A. The B contacts lock in relay 10 and the power is removed from the primary of transformer 9 and from the diode rectifier because the normally closed contacts A of relay 10 have been opened. Thus the sampling circuit is energized through transformer 9 for a period dependent upon the heating time of tube 11.

In the sampling circuit there are three tubes, i. e., rectifiers 17 and 20 and Thyratron 16. The voltages for these tubes are supplied by the transformer 9. The tube 16 is a gas-filled tube, Thyratron or trigger tube; the tube 17 is a full-wave indirectly-heated cathode rectifier functioning to supply the plate voltage to tube 16 through the filter circuit including the inductance 18 and the condenser 31 and the plate load resistance 19 and the half-wave directly-heated diode rectifier 20 supplies the grid bias for tube 16. The filter including the inductance 21 and the capacity 22 smooth the current as rectified by the half-wave rectifier tube 20 and the output of this filter is connected across the resistances 23 and 24, the resistor 23 being about twenty times that of resistance 24. The small bias for the trigger tube 16 is supplied by the voltage across the resistor 24.

When the primary of the transformer is energized, the rectifier tube 20 heats up very quickly and the bias is supplied to tube 16. This bias is determined by the resistance of the prods 25 in the soil. The indirect-heated cathode of rectifier 17 is slow in heating so therefore the high voltage on the plate of tube 16 comes up very slowly. If the bias on the grid of the tube 16 is above the value for the tube to trigger, the tube will not fire. No current will pass through the plate circuit and the relay 29 will not pull in. If the bias is lower or at the value for the tube 16 to fire, the tube will fire; current will pass through the plate circuit and relay 29 will close its normally open contacts A and energize the coil of relay 30. The normally open contacts B of relay 30 will close and lock in the coil of relay 30. The A contacts having closed, the voltage is supplied to the contacts of the secondary clocks 2 and 3. The normally open contacts A of relay 12 function to short circuit the coil of relay 29 at the end of the sampling period. This is necessary, for, if the soil is wet and no water is needed, the tube 16 does not fire, but at the instant the power is removed from transformer 9 the tube 16 fires because there is no drain across the supply and the bias is removed quickly. So the firing of tube 16 will not close relay 29, if the soil does not need watering.

If the soil has been sampled and needs sprinkling, relay 29 will be energized and will cause relay 30 to be energized and locked. Voltage will be supplied to the contacts of the secondary clocks 2 and 3, and the solenoids 6 and 7 will be energized as the clocks' contacts make contact in succession. If soil is sampled and does not need water, the tube 16 will not fire and the relay 29 in the plate circuit of tube 16 will not close so that relay 30 will not be energized and no voltage will be applied to the contacts of secondary clocks 2 and 3. Therefore, the solenoids 6 and 7 will not be energized and watering of the lawn will not take place.

By installing a capped pipe 41 in a vertical position in front of the solenoids 6 and 7 and check valves 42 and 43 after solenoids 6 and 7 respectively, as shown in the drawing, water hammer will be lessened or prevented when the solenoids are deenergized.

When water is passing at high pressure through a feeder line, the sudden interruption of the flow by the closing of a solenoid valve causes high pressure to be set up in the system ahead of the valve. By installing a pipe about two feet long and one and a half inches in diameter which is filled with air, a cushion to the sudden stopping of water will result and prevent the noise and water hammer. Also when the valve is closed, a vacuum will be created behind the solenoid valve due to the high speed of the water. This vacuum causes the water in the pipe behind the valve to come back and cause more water hammer. By installing a small check valve as shown in the diagram so that it can draw in air when the vacuum is created, the hammer or noise will not take place.

To sum up the operation of this control system, the soil is sampled at a predetermined time every day. After sampling the soil, a time delay circuit opens up the sampling system and also the time delay system. If the soil is dry, watering will take place; however, if the soil does not need water, the solenoids controlling the valves cannot be energized and no watering takes place.

If for any reason the control system has to be removed, the double pole double throw switch 5 may be set in the B position and the lawn can be watered as desired. By setting the contacts of clock 1 to make contact during only 12 hours each day, a period of 48 hours will elapse before clocks 2 and 3 make one complete revolution and the sprinkling system may be made to come on every other day. If the contacts on clocks 2 and 3 are permitted to operate only 8 hours a day, it will take 3 days for these clocks to make one revolution; therefore, sprinkling will take place every third day. With toggle switch 8 in the close position, the clocks 2 and 3 will run 24 hours a day and sprinkling will take place every day.

Therefore with the double pole double throw switch 5 in the B position it is possible to operate at a certain time of day every day, every other day, every third day, fourth day, etc. and sprinkling will take place regardless of the moisture content of the soil.

While I have described an embodiment of this invention in detail, it is of course understood that I do not desire to limit this invention to the exact details described except insofar as they may be defined by the following claims.

I claim:

1. An apparatus for electrically controlling the sprinkling or irrigation of soil comprising an electrical device responsive to the moisture content of the soil to be sprinkled or irrigated, said electrical device including a Thyratron and means for adjusting the firing of said Thyratron for different moisture content of the soil, water conveying means for supplying water to the soil, electrical devices comprising solenoid valves for controlling said water conveying means, time control means including a master time control device and a plurality of auxiliary time control devices, each of said auxiliary time control devices being associated with one of said solenoid valves, and connections between said first mentioned electrical device and said time control means for interlocking the operation thereof.

2. An apparatus for electrically controlling the sprinkling or irrigation of soil comprising an electrical device responsive to the moisture content of the soil to be sprinkled or irrigated, said electrical device including a Thyratron and means for adjusting the firing of said Thyratron for different moisture content of the soil, water conveying means for supplying water to the soil, an electrical device for controlling said water conveying means, a time control device associated with said last mentioned electrical device, and connections between said first mentioned electrical device and said time control device for interlocking the operation thereof.

3. An electrical control for a sprinkling or irrigating system comprising a primary clock having electrical contacts adapted to be closed by the clock at predetermined and adjustable times, an electrical soil moisture sampling device, a source of current supply for said device, a time delay apparatus controlled by said primary clock for disconnecting said device after said device has had an opportunity to sample the moisture content of the soil, secondary clocks having electrical circuit controls controlled thereby, solenoid valves connected to said secondary clock circuit controls, relay means connected to said soil sampling device for connecting said circuit controls of said secondary clocks to a source of current supply and for energizing said solenoid valves if the moisture content of the soil is less than desired.

4. An apparatus for electrically controlling the sprinkling or irrigation of soil comprising electrodes positioned in soil to be sprinkled or irrigated, a Thyratron connected to said electrodes, said Thyratron being adjusted to be fired when the moisture content of the soil between said electrodes is low, a time control for connecting said Thyratron to a source of current supply, a time delay device for disconnecting said Thyratron from said source of current supply after the moisture content of the soil is sampled, an irrigation conduit for irrigating said soil, and valve means controlled by said Thyratron for opening said conduit if the moisture content of said soil is lower than desired.

5. An apparatus for electrically controlling the sprinkling or irrigation of soil comprising electrodes positioned in soil to be sprinkled or irrigated, a Thyratron connected to said electrodes, said Thyratron being adjusted to be fired when the moisture content of the soil between said electrodes is low, a time control for connecting said Thyratron to a source of current supply, an irrigation conduit for irrigating said soil, and valve means controlled by said Thyratron for opening said conduit if the moisture content of said soil is lower than desired.

6. An apparatus for electrically controlling the sprinkling or irrigation of soil comprising an electrical device responsive to the moisture content of the soil to be sprinkled or irrigated, said electrical device including a Thyratron and means for adjusting the firing of said Thyratron for different moisture content of the soil, a time control for connecting said Thyratron to a source of current supply, a time delay device for disconnecting said Thyratron from said source of current supply after the moisture content of the soil is sampled, water conveying means for supplying water to the soil, electrical devices comprising solenoid valves for controlling said water conveying means, and a plurality of auxiliary time control devices, each of said auxiliary time control devices being associated with one of said solenoid valves, for energizing said solenoid valves in sequence and means connected to said Thyratron for activating circuits of said auxiliary time control devices when the moisture content of said soil is below that desired.

7. An apparatus for electrically controlling the sprinkling or irrigation of soil comprising an electrical device responsive to the moisture content of the soil to be sprinkled or irrigated, said electrical device including a Thyratron and means for adjusting the firing of said Thyratron for different moisture content of the soil, water conveying means for supplying water to the soil, electrical devices comprising solenoid valves for controlling said water conveying means, a time control device and connections between said first mentioned electrical device and said time control device for interlocking the operation thereof.

8. An electrical control for a sprinkling or irrigating system comprising a primary clock having electrical contacts adapted to be closed by the clock at predetermined and adjustable times, an electrical soil moisture sampling device, source of current supply for said device, a time delay apparatus controlled by said primary clock for disconnecting said device after said device has had an opportunity to sample the moisture content of the soil, solenoid valves, and relay means connected to said soil sampling device for energizing said solenoid valves if the moisture content of the soil is less than desired.

9. An electrical control for a sprinkling or irrigating system comprising a primary clock having electrical circuits adapted to be closed by the clock at predetermined and adjustable times, an electrical soil moisture sampling device, source of current supply for said device, a time delay apparatus controlled by said primary clock for disconnecting said device after said device has had an opportunity to sample the moisture content of the soil, a relay connected to be closed by said moisture sampling device if the soil moisture is low, secondary clocks having electrical circuits controlled by said relay, and solenoid valves connected to said secondary clock electrical circuits whereby said solenoid valves are energized if the moisture content of the soil is less than desired.

10. An electrical control for a sprinkling or irrigating system comprising a primary clock having electrical circuits adapted to be closed by the clock at predetermined and adjustable times, an electrical soil moisture sampling device, source of current supply for said device, secondary clocks having electrical circuits associated therewith, solenoid valves connected to said secondary clock electrical circuits, relay means connected to said soil sampling device for connecting said electrical circuits of said secondary clocks to a source of current supply and for energizing said solenoid valves if the moisture content of the soil is less than desired.

11. An apparatus for electrically controlling the sprinkling or irrigation of soil comprising an electrical device responsive to the moisture content of the soil to be sprinkled or irrigated, said electrical device including a Thyratron, a pair of electrodes adapted to be placed in the soil to be irrigated, connections for connecting one of said electrodes to the grid of said Thyratron, connections for connecting the other of said electrodes to the cathode of said Thyratron, and a variable resistor connected between the control grid and cathode of said Thyratron for adjusting the firing of said Thyratron for different moisture content of the soil, water conveying means for supplying water to the soil, electrical devices for controlling said water conveying means, and electrical apparatus connected between said first mentioned electrical device and said last mentioned electrical devices for controlling the supplying of water to said soil when its moisture content is below that desired.

12. An apparatus for electrically controlling the sprinkling or irrigation of soil comprising an electrical device responsive to the moisture content of the soil to be sprinkled or irrigated, said electrical device including a Thyratron having a cathode and a control grid, a pair of electrodes adapted to be placed in the soil to be sprinkled or irrigated, connections for connecting one of said electrodes to said control grid, a source of grid bias voltage connected to said cathode and to the other of said electrodes, said source of grid bias voltage being connected to permit firing of said Thyratron when the soil moisture content is below that desired, a variable impedance circuit connected between said control grid and said cathode to adjust the firing of said Thyratron for different moisture content of the soil, water conveying means for supplying water to the soil, electrical devices for controlling said water conveying means, and electrical apparatus connected between said first mentioned electrical device and said last mentioned electrical devices for controlling the supplying of water to said soil when its moisture content is below that desired.

13. An apparatus for electrically controlling the sprinkling or irrigation of soil comprising an electrical device responsive to the moisture content of the soil to be sprinkled or irrigated, said electrical device including a Thyratron having a control grid, a pair of electrodes adapted to be placed in the soil to be sprinkled or irrigated, a source of grid bias voltage connected to said control grid in series with said electrodes, said source of grid bias voltage being connected to permit firing of said Thyratron when the soil moisture content is below that desired and means for adjusting the firing of said Thyratron for different moisture content of the soil, water conveying means for supplying water to the soil, electrical devices for controlling said water conveying means, and electrical apparatus connected between said first mentioned electrical device and said last mentioned electrical devices for controlling the supplying of water to said soil when its moisture content is below that desired.

14. An apparatus for electrically controlling the sprinkling or irrigation of soil comprising an electrical device responsive to the moisture content of the soil to be sprinkled or irrigated, said electrical device including a Thyratron having a cathode and a control grid, a pair of electrodes adapted to be placed in the soil to be sprinkled or irrigated, a source of grid bias voltage connected to said control grid in series with said electrodes to apply a negative voltage to said grid with respect to said cathode to permit the firing of said Thyratron only when the soil moisture content is below that desired, a variable impedance circuit connected in shunt to said source of grid bias voltage and said electrodes for adjusting the firing of said Thyratron for different moisture content of the soil, water conveying means for supplying water to the soil, electrical devices for controlling said water conveying means, and electrical apparatus connected between said first mentioned electrical device and said last mentioned electrical devices for controlling the supplying of water to said soil when its moisture content is below that desired.

BARTON W. PARKER.

REFERENCES CITED

The following references are of record in the file of this patent:

UNITED STATES PATENTS

| Number | Name | Date |
|---|---|---|
| 1,018,251 | McKee | Feb. 20, 1912 |
| 2,031,146 | Dodge | Feb. 18, 1936 |
| 2,045,381 | Elberty | June 23, 1936 |
| 2,318,969 | Reynolds | May 11, 1943 |
| 2,327,690 | Ackerman | Aug. 24, 1943 |
| 2,358,433 | Wolfner | Sept. 19, 1944 |
| 2,432,390 | Darby | Dec. 9, 1947 |